United States Patent Office 3,118,318
Patented Jan. 21, 1964

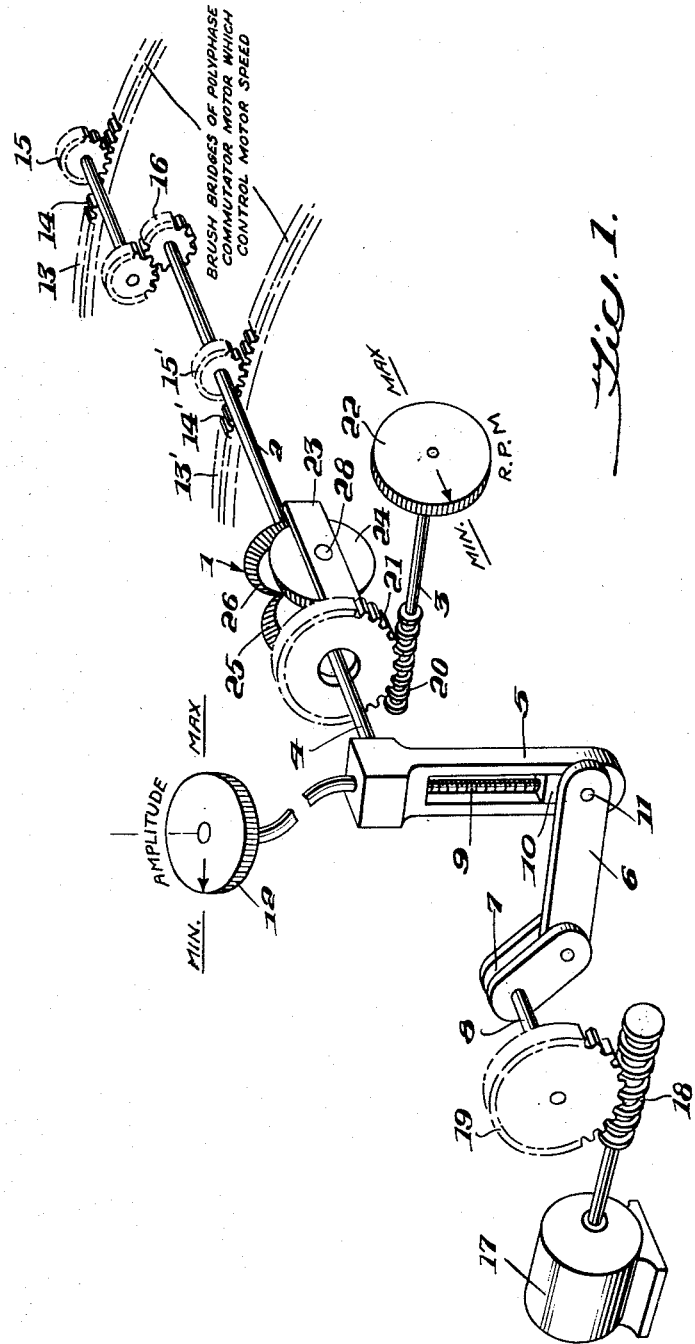

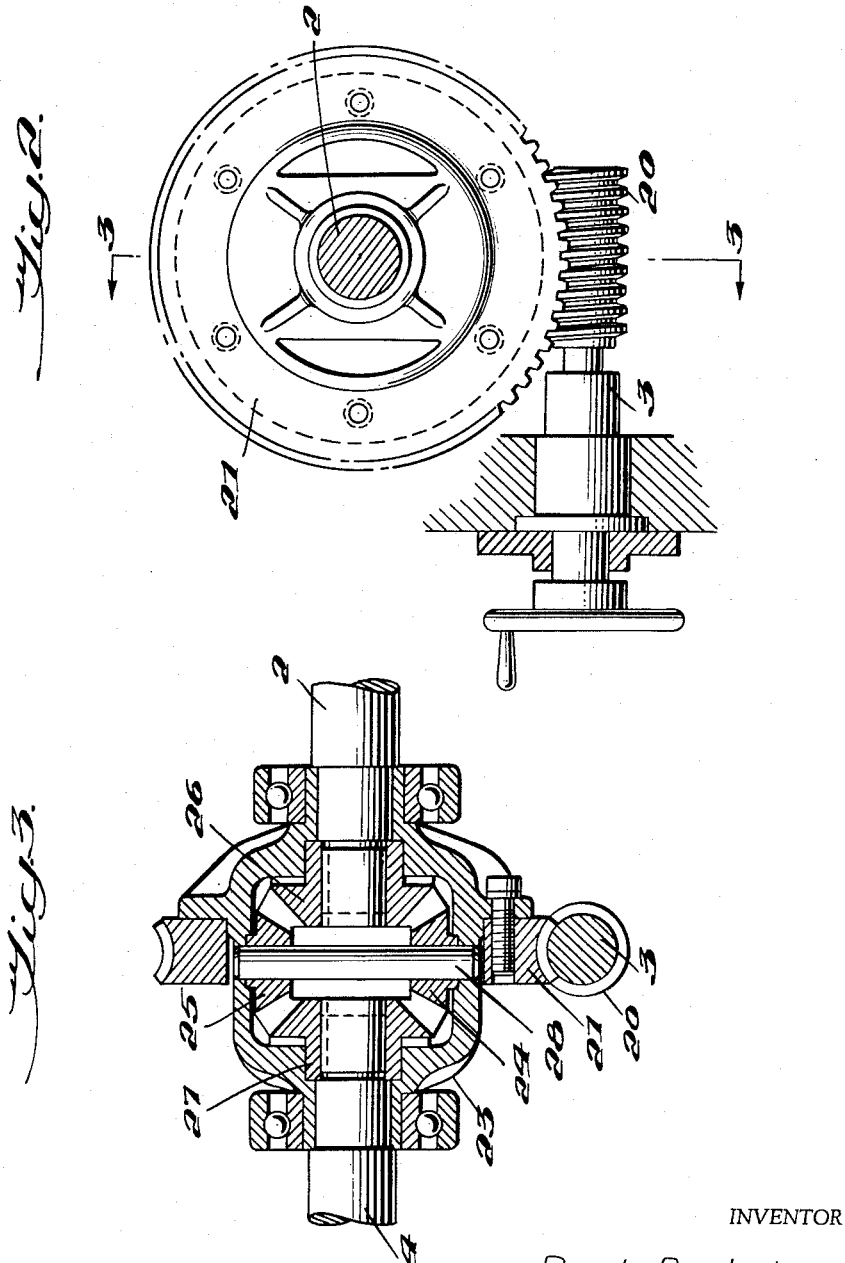

3,118,318
ARRANGEMENT FOR PERIODICALLY VARYING THE SPEED OF POLYPHASE COMMUTATOR MOTORS
Paul Rauhut, Ennetbaden, Aargau, Switzerland, assignor to Aktiengesellschaft Brown, Boveri & Cie, Baden, Switzerland, a joint-stock company
Filed Dec. 23, 1960, Ser. No. 78,049
Claims priority, application Switzerland Dec. 30, 1959
6 Claims. (Cl. 74—394)

The present invention relates to speed control arrangements for electric motors and particularly for motors of the polyphase commutator type wherein a change in speed can be effected by changing the position of the brushes.

The polyphase commutator motor has the advantage that its speed, i.e. its number of revolutions per minute (r.p.m.) can be changed simply by brush displacement. Most frequently used in the rotor-fed shunt commutator motor, the so-called Schrage-motor. In it the carbon brushes rest upon two brush bridges which can be shifted in opposition to each other. The r.p.m. is adjusted by rotation of a control shaft and through this of the brush bridges. Since the motor has shunt behavior, its r.p.m. corresponds approximately to the brush position in a given case.

There are operations in which difficult demands are made of the regulation of the r.p.m.; for example it is desired that the velocity of the working machine is to follow a complicated rule. Such a case exists when the Schrage motor serves to drive a synchronous generator, of which it is demanded that its frequency not only can be adjusted to any desired average value, but also is to fluctuate periodically about this average value. Such requirements are set up for example in the textile industry. There is here involved the joint regulation of the r.p.m. of several small reluctance motors. One then regulates to advantage the frequency of the feeding generator, by regulating the r.p.m. of the driving motor, which may be a Schrage-motor. To adjust the basic r.p.m., the brushes of the Schrage-motor must be brought into a middle position; they are to be moved back and forth periodically about this. The problem could be solved by driving the control shaft with a direct current motor and controlling it accordingly. The demands would, however, be great because of the constant issuance of controlling orders with difficult dependency. In addition, the motor would have to be reversed in rapid succession, through which it would be seriously strained. Finally a further complication arises when the frequency and the amplitude of the superimposed fluctuations must be adjusted.

The invention has for itself the purpose of avoiding these difficulties by using mechanical means. It relates to a device for the periodic changing of the r.p.m. of a polyphase commutator motor by brush displacement, characterized in that the brush bridges are connected with the output shaft of a differential gearing that changes their position, whereby an input shaft to this gearing is equipped with means for adjustment by displacement, and a second input shaft to this gearing with means for effecting a periodic back and forth rotation of this second input shaft with variable period number and amplitudes, with which the average r.p.m. as well as their periodic fluctuation can be adjusted independently of each other during operation.

In the movement of the brush bridges, only small friction forces need be overcome, but no electrical torque, such as exerted for example by induction regulators. Moreover, the gyrating mass of the brush bridges is small. Two control programs for the r.p.m. of the Schrage-motor can be transmitted through the differential gearing to the output shaft by means of the two input shafts, respectively. The possibility exists of bringing the brush bridges into such a position by one adjusting shaft, that the r.p.m. corresponds to the desired average value. This average value can be arbitrarily changed or regulated in operation, for example to a constant value or in dependence on another magnitude, perhaps as a function of time, or a mechanical magnitude which plays an important role in the manufacturing process, such as the tension of the wound up thread, diameter of a thread roll, etc. At the other adjusting shaft, the periodic rotation back and forth of the drive shaft can be so effected that the r.p.m. of the Schrage-motor fluctuates about the average value in the desired manner, which may become necessary for example when a periodic change in the thread pull is required.

In order that the control at the two adjusting shafts of the differential gearing can be carried out independently of each other, an unintentional rotation of the same must be prevented. According to the invention, a gearing which is essentially non-reversible is interposed in the drive for the shaft in question for this purpose, for example, a worm gear with suitably chosen pitch of the worm wheel. This essentially non-reversing gearing can be driven by a remote control motor.

The periodic oscillation of an adjusting shaft of the differential gearing can be effected in different ways, for example by a cogwheel which engages in a rack, which is moved back and forth. One obtains a particularly advantageous arrangement according to the invention by using a crank type of drive in which the crank always rotates in the same direction and transmits oscillating motion to the adjusting shaft through a connecting rod and lever. Hard jolts are avoided and no increased wear occurs. The other machine parts with pulsating motion can also be easily built by a known method so that they withstand the changing forces.

The frequency of the fluctuation of the r.p.m. of the commutator motor can be changed according to the invention by driving the crank shaft with a remote control motor with variable r.p.m.

A further development of the invention makes possible the change of the amplitude of the fluctuation of the r.p.m. of the commutator motor. An adjustment on the crank drive is sufficient for this, for example a change in the effective length of the crank. Various means are also available for the readjustment of the length of the lever, for example a link motion or a spindle with a nut, adjustable longitudinally of the spindle, which are built into the lever. The spindle must not turn unintentionally. Its drive shaft is either blocked after the readjustment, or a non-reversing joint is built in. If a remote control motor is adapted for effecting the rotation of the spindle, then the possibility exists to change the magnitude of the fluctuation of the r.p.m. of the commutator motor during operation, or even to regulate it.

The foregoing objects and advantages of the invention will become more apparent from the following description of one embodiment thereof and from the accompanying drawings wherein:

FIG. 1 is a view in perspective showing the improved speed control for a polyphase commutator motor;

FIG. 2 is a view in side elevation of the differential gear mechanism employed in the speed control apparatus illustrated somewhat schematically in FIG. 1, the view being at an enlarged scale; and FIG. 3 is a view in central section on line 3—3 of FIG. 2.

With reference now to the drawings, the motor speed control is seen to include a differential gearing of known construction which is indicated at 1. The output shaft 2 of this gearing serves for the direct changing of the brush position of the polyphase commutator motor. As previously explained, the speed of the motor is controlled by changing the position of brushes which bear on the commutator of the rotor and these brushes are located on brush bridges 13, 13' which are arranged to be shifted in opposite directions of rotation. The peripheries of the bridges 13, 13' are provided with toothed portions 14, 14' which mesh respectively with drive pinions 15, 15' that are driven from the output shaft 2. Pinion 15' is driven directly from shaft 2 while pinion 15 is driven indirectly from this shaft through an idler gearing 16 so that the brush bridges 13, 13' will rotate in opposite directions. In the interest of simplifying the drawings, the motor brushes and other parts of the polyphase commutator motor, i.e. the so-called Schrage motor, which are conventional, have not been included in the drawing. Through a second shaft 3 working as an input to the differential gearing 1 can be arbitrarily adjusted or regulated the position of the brush bridges 13, 13' of the Schrage motor and with it its r.p.m. With reference now to FIGS. 2 and 3 which illustrate the differential gearing more specifically, output shaft 2 of the differential gearing which drives the brush bridges receives its rotation from a bevel gear 26 to which the shaft is secured. Gear 26 is meshed with two gear wheels 24, 25 which are mounted for rotation freely on a cross shaft 28 which is supported in a cage 23. To this cage 23 is secured a worm wheel 21 which is meshed with a worm gear 20 that is rotated by the second shaft 3, the latter being rotated by the handwheel 22 and serving as an input to the differential gearing. Gear wheels 24, 25 are also meshed with a bevel gear 27 which is secured rigidly upon a third shaft 4 to the differential gearing.

On the third shaft 4 which serves as another input to differential gearing 1 is mounted a lever 5, which is set into a pendulum motion by connecting rod 6 and the crank 7. For this purpose the crank shaft 8 which drives crank 7 is kept in uniform rotating motion. A drive motor 17 is used for this, which is coupled to the shaft 8 through a non-reversing gearing represented by a worm gear 18 driven by motor 17 and which meshes with a worm wheel 19 secured upon shaft 8. The pendulum motion of the lever 5 results in a periodic oscillation of the shaft 4, and if the shaft 3 is fixed, there is also obtained a periodic oscillation of the shaft 2. Through this, a periodic fluctuation is superimposed on the r.p.m. of the commutator motor by a change in brush position.

The lever 5 contains a spindle 9 with a roving nut 10 on which is located the pivot shaft 11 of the connecting rod 6. By means of the knurled nut 12 it is possible to rotate the spindle 9 through which the roving nut is displaced longitudinally of the spindle and in the final analysis the effective length of the lever 5 is changed. Should the spindle be adjusted during operation, then a transition from the pendulum motion to parts at rest must be created. This is possible for example by using a flexible shaft, which takes the place of the nut. Or one can provide a universal joint which is arranged in the axis of rotation of the lever 5. A change in length of the lever 5 corresponds to a change in the magnitude of the fluctuation of the r.p.m. of the Schrage-motor. The frequency of this fluctuation can be adjusted by changing the r.p.m. of the crank shaft 8. All the mentioned attunements can be undertaken independently of each other and if necessary even simultaneously.

The speed control device in accordance with the invention operates in the following manner.

As previously explained, the speed of the Schrage motor is adjusted by mutual displacement of the brush bridges 13, 13' in opposite directions by means of the output shaft 2. When the motor speed is required to be varied periodically with respect to a selected mean value, thus deviating up and down by a definite amount from the mean value, movement of shaft 2 must fulfill the following two conditions.

(1) The mean rotary position of shaft 2 must be adjustable in such manner that when in service it is not affected by the periodic rotation which is superimposed on this shaft by oscillation of shaft 4.

(2) The periodic rotation must be added to the aforesaid mean rotation of shaft 2.

Condition 1 is fulfilled in that the basic speed of the Schrage motor is determined by adjustment of shaft 3 by means of the worm gearing 20, 21. If, for example, handwheel 22 is turned counter-clockwise, the cage 23 of the differential gearing 1 which is rotated by worm wheel 21 will rotate clockwise, output shaft 2 of the differential gearing turns counterclockwise, the front brush bridge 13 turns clockwise, and the rear brush bridge 13' turns counter-clockwise so that the mean speed of the motor is decreased. When shaft 3 is turned in the opposite direction, the relative directions of rotation of the brush bridges will be reversed, i.e. brush bridge 13 will turn counterclockwise and brush bridge 13' will turn clockwise thereby effecting an increase in the mean speed of the motor.

Condition 2 is realized by causing lever 5 to oscillate and transmitting this oscillation by means of input shaft 4 to the differential gearing 1 and thence to output shaft 2. Rotation of shaft 4 in one direction through a given angle results in rotation of output shaft 2 through the same angle but in an opposite direction from that of shaft 4. Thus, the differential gearing 1 serves as a summation device for the rotary movements of shafts 3 and 4.

The variable speed motor 17 drives worm gearing 18, 19 and hence, drives crankshaft 8 and crank 7 in rotation. This causes reciprocatory motion to be imparted to connecting rod 6 which latter effects the necessary oscillation of lever 5 and hence, also input shaft 4 which performs the periodic rotation required under condition 2. The amplitude of the angle of rotation of shaft 4 depends upon the position of nut 10, and the position of this nut can be adjusted continuously during service by rotating handwheel 12 which serves to rotate the spindle 9.

The device according to the invention is suitable, due to its simplicity, quite particularly for those operations in which the fluctuations in r.p.m. occur relative repidly, for example have a period duration of one second and less, but especially also where the fluctuation frequency and amplitude must be constantly changed according to definite viewpoints.

I claim:

1. In an apparatus for effecting a periodic change in the speed of a variable speed polyphase commutator motor having a rotatably adjustable brush bridge and wherein the position of the brush bridge determines the motor speed, the combination comprising a differential gearing having a rotatable output shaft drivably connected to said brush bridge for rotatably adjusting said brush bridge, two rotatable input shafts, two oppositely disposed gears secured respectively to said output shaft and one of said input shafts and a rotatable cage including rotatable gearing means thereon meshed with said oppositely disposed gears, the other of said input shafts being drivably connected by gearing to said cage for rotatably adjusting said cage, means for rotatably adjusting one of said input shafts to a selected position to thereby effect a corresponding rotatable adjustment of said output shaft and hence also said brush bridge to a selected position, means for imparting an oscillatory motion to said other input shaft to effect a corresponding oscillatory adjustment of the position of said output shaft and hence also said brush bridge from said selected position, and means for adjusting the period and magnitude of the oscillatory motion imparted to said other input shaft to thereby effect a corresponding adjustment in the period and magnitude of the oscillatory motion of said brush bridge from said selected position.

2. The combination as defined in claim 1 wherein said means for rotatably adjusting one of said input shafts to a selected position includes a non-reversing type of gear drive.

3. The combination as defined in claim 1 wherein said means for imparting an oscillatory motion to said other input shaft comprises a drive motor, a crank rotatable by the drive shaft of said drive motor, a connecting rod articulated at one end of said crank, and a lever secured at one end to said other input shaft, the other end of said lever being articulated to the other end of said connecting rod.

4. The combination as defined in claim 3 wherein the effective length of said lever is adjustable to thereby effect the said adjustment in magnitude of the oscillatory motion imparted to said other input shaft.

5. The combination as defined in claim 3 wherein said lever includes a spindle, and a nut thereon adjustable longitudinally of said spindle, said other end of said connecting rod being connected to said nut through an articulating joint, and wherein said means for adjusting the magnitude of the oscillatory motion imparted to said other input shaft includes means for adjustably rotating said spindle to thereby adjust the longitudinal position of said nut thereon and hence effect a corresponding adjustment in the effective length of said lever.

6. The combination as defined in claim 5 wherein said means for adjustably rotating said spindle includes a flexible shaft.

References Cited in the file of this patent

UNITED STATES PATENTS

| | | |
|---|---|---|
| 272,392 | Wheeler | Feb. 13, 1883 |
| 1,560,724 | Potts | Nov. 10, 1925 |
| 1,743,252 | Tanner | Jan. 14, 1930 |
| 1,745,961 | Tanner | Feb. 4, 1930 |
| 2,301,543 | Hlavaty | Nov. 10, 1942 |
| 2,661,435 | Bergknut et al. | Dec. 1, 1953 |
| 2,739,447 | Newell | Mar. 27, 1956 |

FOREIGN PATENTS

| | | |
|---|---|---|
| 222,250 | Great Britain | Apr. 18, 1924 |